United States Patent Office 3,094,499
Patented June 18, 1963

---

3,094,499
PROCESS FOR PREPARING STABLE AQUEOUS PIGMENT DISPERSIONS
Hans U. Gassmann and Hans R. Zbinden, Basel, Switzerland, assignors to Ciba Limited, Basel, Switzerland
No Drawing. Filed July 6, 1960, Ser. No. 41,016
Claims priority, application Switzerland July 7, 1959
6 Claims. (Cl. 260—29.4)

The present invention provides a process for the manufacture of stable aqueous pigment dispersions, wherein an aqueous pigment filter cake is mixed with a non-ionic dispersant of the type of the polyglycol ether derivatives which is soluble in an acid to weakly alkaline aqueous medium but insoluble in concentrated aqueous alkalis, the resulting mixture containing the dispersant in aqueous solution is treated with sufficient alkali hydroxide to cause the dispersant to separate out of the aqueous alkaline solution and to form a separate phase; the pigment is then transferred by a mechanical treatment into the dispersant phase; the resulting pigment-free aqueous alkaline solution is substantially separated and the dispersant is reconverted into an aqueous solution which contains the pigment in a finely dispersed state.

Non-ionic dispersants suitable for use in the present process are those of the type of the polyglycol ether derivatives which are soluble in an acid to weakly alkaline aqueous medium but insoluble in concentrated aqueous alkalis. Such non-ionic dispersants are known or can be made by known methods, for example by reacting 5, 15, 30, 50, 75, 100, 150 or more mols of ethylene oxide and, if desired, propylene oxide with a water-insoluble organic compound containing at least one reactive hydrogen atom and a hydrophobic radical with at least 8 carbon atoms. There may be mentioned, for example, water-soluble ethylene oxide condensation products of higher monohydric, aliphatic or cyclic alcohols such as lauryl alcohol, myristyl alcohol, cetyl alcohol, octadecyl alcohol, oleyl alcohol, arachidyl alcohol, linoleyl alcohol, ricinoleyl alcohol, dihydroricinoleyl alcohol; furthermore wax alcohols, wool fat alcohols, resin alcohols such as hydroabietyl alcohol or naphthene alcohol, of higher amines such as cetylamine, octadecylamine, octadecenylamine, arachidylamine, behenylamine, diheptylamine, didodecylamine, dioctadecylamine, methyloctadecylamine, resin amines such as hydroabietylamine, aromatic-aliphatic amines such as octodecylpara-toluidine, of higher alkylmercaptans such as cetylmercaptan, dodecylmercaptan and hexadecylmercaptan, or of higher carboxylic acids or corboxylic acid amides such as lauric acid, palmitic acid, ricinoleic acid or oleic acid, resin acids or amides of these acids; furthermore of alkylphenols such as para-tertiary amylphenol, isohexylphenol, paratertiary octylphenol, thymol, para-nonylphenol, isooctylresorcinol, 2:6-di-tertiary butyl-para-cresol, dodecylphenol or octadecylphenol.

These non-ionic dispersants have the formula

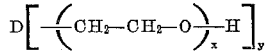

wherein $x$ times $y$ is at least 5 and at the most 150, $y$ is 1 or 2, and D is the radical of a water-insoluble organic compound containing $y$ reactive hydrogen atoms and a hydrophobic radical with at least 8 carbon atoms, for example, one of the radicals

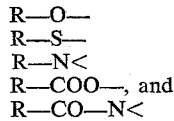

wherein R is a hydrocarbon radical having at least 8 carbon atoms.

Dispersants of the kind defined above, particularly suitable for performing the present process, are, for example, the reaction products of:

10, 15, 25 or 35 mols of ethylene oxide with 1 mol of hydroabietyl alcohol,
25 mols of ethylene oxide with 1 mol of castor oil,
50 mols of ethylene oxide with 1 mol of dodecylmercaptan,
7.5 mols of ethylene oxide with 1 mol of para-tertiary octylphenol,
50 mols of ethylene oxide with 1 mol of oleic acid,
15 mols of ethylene oxide with 1 mol of di-tertiary butyl-para-cresol,
9.6 mols of propylene oxide and 10.5 mols of ethylene oxide with 1 mol of para-tertiary octylphenol,
15 or 20 mols of ethylene oxide with 1 mol of para-nonylphenol,
25 mols of ethylene oxide with 1 mol of octadecyl alcohol,
15 mols of ethylene oxide with 1 mol of dodecylamine,
8 mols of ethylene oxide with 1 mol of oleylamine,
100 mols of ethylene oxide with 1 mol of a fatty alcohol mixture (obtained by reducing coconut fat) or
15 mols of ethylene oxide with 1 mol of para-tertiary octylphenol.

It is also possible to use a mixture containing 2 or more dispersants of the aforementioned kind.

The present process is advantageously performed with an aqueous pigment filter cake such as is obtained in the manufacture or conditioning of organic pigment colors. There may be used, for example, pigment filter cakes of water-insoluble azo dyestuffs, oxazine dyestuffs, vat dyestuffs or of possibly halogenated copper phthalocyanines. Since in the present process the pigment always comes into contact with an aqueous solution of a strong alkali, it can be performed only with organic pigments that are resistant to alkalis.

It is of advantage to carry out the present process by mixing the aqueous pigment filter cake in a suitable stirring or kneading apparatus with a non-ionic dispersant of the aforementioned kind. For every part by weight of dry pigment about 0.5 to 2 or more parts by weight of dispersant may be used. A preferred ratio is 0.6 to 1.0 part of dispersant for every part of pigment. As soon as a more or less homogeneous aqueous paste has formed, it is treated while being kneaded and if necessary heated to a raised temperature, for example to 35–90° C., with an amount of alkali hydroxide solution sufficient to cause the dispersant to separate out of the aqueous alkaline solution and to form a separate phase. For this purpose there are used concentrated aqueous alkali hydroxide solutions, for example sodium hydroxide solution of 30–50% strength, or alkali metal hydroxides in solid form, for example potassium hydroxide of 90% purity, in a manner such that it forms with the water stemming from the filter cake an alkali hydroxide solution of about 8 to 20% strength. By this operation the pigment is caused to migrate into the water-insoluble dispersant phase, whereupon it forms together with the dispersant a plastic mass. The water stemming from the filter cake, together with the alkali dissolved therein, is then substantially separated. A small proportion of the aqueous alkali hydroxide solution remains dispersed in the pigmented, water-insoluble dispersant phase.

According to the invention the pigmented, water-insoluble dispersant phase can be converted into an aqueous solution containing the pigment suspended in finely dispersed form by partially or wholly neutralizing the alkali remaining in the plastic flushed mass with an acid, for example glacial acetic acid, treating it with the desired amount of water and, if the temperature had been raised, bringing it down again to room temperature. Alternatively, the dispersant phase can be converted by a simple addition of water into an aqueous solution in which the pigment is suspended in a finely dispersed form; this is more especially the case when the dispersant phase only contains a small amount of alkali hydroxide immediately before it is reformed into an aqueous solution. Another way of redissolving the dispersant consists in adding to the plastic flushed mass an anion-active dispersant, for example a fatty alcohol sulfonate or sodium 2-heptadecyl-N-benzyl-benzimidazole disulfonate, and diluting the whole with water.

If the stable, aqueous pigment dispersion prepared according to the present process is to contain in addition to the pigment further permanently water-insoluble substances, such as natural or synthetic resins, more especially water-insoluble hardenable aminoplast resins, solvents or plasticizers such as dioctylphthalate, it is of advantage to incorporate these permanently water-insoluble substances with the water-insoluble dispersant phase formed because this makes it possible and easy to ensure completely homogeneous mixing of the ingredients. If desired, the aforementioned permanently water-insoluble substances may be added before or during the formation of the water insoluble dispersant phase; this is particularly advantageous when neither the non-ionic dispersant nor the permanently water-insoluble substance by itself is capable of forming together with the pigment a plastic mass which is easy to separate from the accompanying water. After the dispersant of the flushed mass has been reconverted into an aqueous solution, these permanently water-insoluble substances remain, either by themselves or together with the pigment, as a finely dispersed internal phase within the aqueous paste forming the final product of the process.

As water-insoluble hardenable aminoplast resins there are suitable, for example, such products as are obtained in the known manner by etherifying methylol compounds of substances of amide character capable of forming hardenable aminoplasts with formaldehyde, such as guanidine, dicyandiamide, biuret, thiourea and more especially urea, furthermore aminotriazines containing at least two primary amino groups capable of reacting with formaldehyde, such as benzoguanamine, acetoguanamine, formoguanamine and more especially melamine, with alcohols containing 4 to 8 carbon atoms, for example with amyl alcohol, hexyl alcohol, cyclohexanol, benzyl alcohol and more especially n-butanol. Furthermore, there may be used hardenable, water-insoluble, etherified methylol compounds that contain in addition to the ether radicals acyl radicals of higher carboxylic acids containing more than 8 carbon atoms, such as pelargonic, lauric, myristic, oleic, stearic acid or soybean fatty acid. When such higher acyl radicals are present, the compounds may also be derived from methylol ethers with lower, water-soluble alcohols containing, for example 1 or 2 carbon atoms, for example from methylol methyl ethers. The manufacture of such hardenable, water-insoluble etherified methylol compounds is likewise known. Accordingly, the present process may be performed, if desired, with hardenable, water-insoluble etherified methylol compounds of substances of amide character capable of forming hardenable aminoplasts with formaldehyde, in which the oxygen atom of at least one methylol group is linked to a hydrocarbon radical having 4 to 8 carbon atoms, or alternatively with those in which one oxygen atom of at least one methylol group is linked to a hydrocarbon radical, containing 1, 2 or more, for example 3 or 4 carbon atoms, while one oxygen atom of at least one further methylol group is linked to the acyl radical of a fatty acid containing more than 8 carbon atoms.

In the following examples parts and percentages are by weight.

Example 1

1086 parts of an aqueous filter cake containing 18.4% of 4:4':7:7'-tetrachloro-thioindigo (corresponding to 200 parts of dry pigment) are mixed in a kneader with 350 parts of a non-ionic dispersant prepared by adding on to 1 mol of para-tertiary octylphenol in a first stage 9.6 mols of propylene oxide and thereupon 10.5 mols of ethylene oxide. After kneading for some time a thinly liquid homogeneous paste is obtained. Upon addition of 250 parts of aqueous sodium hydroxide solution of 30% strength the paste separates into two phases that are insoluble in each other. The whole is further kneaded and at the same time heated to 60° C., and the pigment and the dispersant finally agglomerate to form a smeary water-insoluble mass. After decanting 1000 parts of the aqueous, strongly alkaline liquid there are obtained 686 parts of flushed mass which remains in the kneader. The alkali which remained in the flushed mass is then neutralized with 13 parts of glacial acetic acid and the whole is diluted with 301 parts of water, to form 1000 parts of a homogeneous, finely dispersed pigment paste containing 20% of pigment.

Example 2

530 parts of an aqueous filter cake containing 37.7% (=200 parts) of β-copper phthalocyanine are mixed in a kneader with 214 parts of a non-ionic dispersant prepared by adding 7.5 mols of ethylene oxide on to 1 mol of para-tertiary octylphenol, until a homogeneous paste has formed. There are then added 20 parts of aqueous sodium hydroxide solution of 30% strength and the whole is gradually heated to 80° C., whereupon it separates into two phases and the pigment combines with the dispersant (which has turned insoluble in water) to form a kneadable mass.

135 parts of aqueous alkali solution are then decanted to leave in the kneader 430 parts of flushed mass. During the kneading operation 199 parts of water evaporate. As revealed by titration the flushed mass still contains about 2 parts of sodium hydroxide. By adding 50 parts of sodium 2-heptadecyl-N-benzyl-benzimidazole disulfonate and diluting with 320 parts of water there are obtained, without neutralization, 800 parts of a finely dispersed aqueous pigment paste.

Example 3

705 parts of a pigment filter cake containing 34% (=240 parts) of chlorinated copper phthalocyanine are mixed in a kneader with 240 parts of a dispersant prepared by adding 15 mols of ethylene oxide on to 1 mol of hydroabiethyl alcohol. After a short time a thinly liquid but not yet quite homogeneous paste is obtained. There are then added 200 parts of sodium hydroxide solution of 30% strength, whereupon the paste separates spontaneously into two phases. On further kneading the pigment gradually migrates into the dispersant phase so that after a short time two separate phases are obtained, namely 750 parts of a soft, kneadable substance containing the pigment, the dispersant as well as 270 parts of aqueous sodium hydroxide solution of about 9% strength, and a liquid phase consisting of 395 parts of sodium hydroxide solution of 9% strength, which latter is then removed from the kneader. To concentrate the flushed mass, it is repeatedly kneaded with 500 parts of sodium hydroxide solution of 20% strength on each occasion, whereby the weight of the flushed mass is finally reduced to 550 parts, made up of 240 parts each of pigment and dispersant and 70 parts of sodium hydroxide solution of 20% strength. When for washing the flushed cake a sodium hydroxide solution is used having a concentration superior to 20% strength, the weight of the paste can no longer be lowered, but owing to the higher concentration of the alkali hydroxide solution the paste has in such a case a higher final content of sodium hydroxide. On the other hand, when an alkali hydroxide solution of less than 20% strength is used for washing, the weight of the flushed mass increases: For example, with sodium hydroxide solution of 15% strength there are obtained 580 parts of flushed mass, of which 100 parts are sodium hydroxide solution, while, for example, an alkali solution of 10% strength yields 640 parts of flushed mass of which 160 parts are sodium hydroxide solution. This means that the optimum concentration is an alkali solution of 20% strength because in this case the amount of sodium hydroxide remaining in the flushed mass passed through a minimum.

By neutralizing with
21 parts of glacial acetic acid and diluting with
429 parts of water there are finely obtained
1000 parts of an extremely fine dispersion of the pigment in the form of a homogeneous, viscid paste containing 24% of pigment and 24% of dispersant. This dispersion can be used, for example, in conjunction with a suitable binder for dyeing and printing textile materials.

Instead of the non-ionic dispersant obtained from 1 mol of hydroabietyl alcohol and 15 mols of ethylene oxide there may be used one prepared from 1 mol of dodecylamine and 15 mols of ethylene oxide, or from 1 mol of octadecyl alcohol and 25 mols of ethylene oxide.

*Example 4*

470 parts of a pigment filter cake containing 34% (=160 parts) of chlorinated copper phthalocyanine are mixed in a kneader with
160 parts of a condensation product (dispersant) from 1 mol of oleylamine and 8 mols of ethylene oxide, with addition of
183 parts of sodium hydroxide solution of 30% strength. At first, a soft paste consisting of two phases forms which does not change when further kneaded without heating. When the kneader is heated so that the temperature of the paste gradually rises, the oily phase which contains the condensation product (dispersant) and the pigment agglomerates at about 70° C. to form a soft, kneadable mass from which aqueous sodium hydroxide solution exudes. Without previous cooling,
173 parts of aqueous sodium hydroxide solution of about 11% strength are decanted, while
640 parts of paste remain in the apparatus. The paste is kneaded twice with
300 parts of sodium hydroxide solution of 30% strength on each occasion at 35 to 50° C. and each time the aqueous phase is decanted so that the final weight of the paste, from which further aqueous sodium hydroxide solution has exuded, amounts to
380 parts. The resulting product consists of 160 parts of pigment, 160 parts of dispersant and 60 parts of sodium hydroxide solution of 27% strength. The whole is finally neutralized with
24 parts of glacial acetic acid and the paste is made up with water to
640 parts, forming a viscid, green paste containing 25% of the pigment in an extremely fine dispersion.

*Example 5*

363 parts of a pigment filter cake containing 36.3% (=132 parts) of the brown dyestuff of the formula are mixed in a kneader with
80 parts of a non-ionic dispersant prepared by adding 25 mols of ethylene oxide on to 1 mol of castor oil, and
200 parts of sodium hydroxide solution of 30% strength. Two phases are immediately formed: A doughy paste made up of the pigment and the dispersant which is insoluble in the other phase consisting of aqueous sodium hydroxide solution. After decanting
393 parts of aqueous sodium hydroxide solution there remain in the kneader
250 parts of flushed mass containing in addition to the pigment and the dispersant 38 parts of aqueous sodium hydroxide solution.

This paste is washed by being kneaded twice with 200 parts of sodium hydroxide solution of 15% strength on each occasion and there are finally obtained
258 parts of flushed mass ready for use consisting of 51.1% of pigment, 31.0% of dispersant and 17.9% of aqueous sodium hydroxide solution. After neutralizing with
20 parts of glacial acetic acid and adding
122 parts of water, there are finally obtained
400 parts of a very finely dispersed pigment paste containing 33% of pigment which can be diluted with water in any desired proportion and which can be used, for example, together with a suitable binder for dyeing and printing textile materials. Instead of the non-ionic dispersant prepared from 1 mol of castor oil and 25 mols of ethylene oxide there may be used one prepared from 1 mol of oleylamine and 8 mols of ethylene oxide.

*Example 6*

231 parts of a pigment filter cake containing 43.2% (=100 parts) of the red pigment of the formula are mixed at about 50° C. in a kneader with
70 parts of a non-ionic dispersant prepared by adding 50 mols of ethylene oxide on to 1 mol of dodecyl-mercaptan. Within a short time a thinly liquid homogeneous aqueous phase forms. Addition of
66 parts of sodium hydroxide solution of 30% strength causes the paste to split spontaneously into two phases and the pigment begins to migrate into the water-insoluble phase. While the kneading is continued for some time a compact substance consisting of the pigment and the dispersant forms and
120 parts of sodium hydroxide solution of about 9% strength which is free from pigment can be decanted. The residue is washed once more for a few minutes with 500 parts of sodium hydroxide solution of 15% strength, the liquor is decanted, and there are obtained 215 parts of a plastic substance containing the pigment, the dispersant and about 45 parts of aqueous alkali solution. After neutralizing with 10 parts of glacial acetic acid and diluting with 175 parts of water there are finally obtained 400 parts of a viscid paste containing 17.5% of the non-ionic dispersant and 25% of pigment in a finely dispersed form.

*Example 7*

343 parts of a pigment filter cake containing 29.2% (=100 parts) of the pigment of the formula

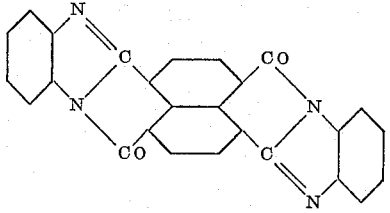

are mixed in a kneader with 100 parts of a non-ionic dispersant prepared by adding 50 mols of ethylene oxide on to 1 mol of oleic acid. A thinly liquid paste is obtained which is treated with 50 parts of solid potassium hydroxide of 90% purity. The whole is heated to 60° C. and the pigment begins to agglomerate with the dispersant to form a plastic substance from which a pigment-free aqueous phase separates. After some time 135 parts of aqueous potassium hydroxide solution can be decanted. Another 40 parts of the above-mentioned non-ionic dispersant are then added and the dough is washed once each with 400 parts of potassium hydroxide solution of 15% strength and with 400 parts of potassium hydroxide solution of 20% strength by being kneaded at about 50° C.

The washing liquor is decanted and there are finally obtained 334 parts of flushed mass containing in addition to the pigment and the dispersant also 94 parts of potassium hydroxide solution of about 20% strength. The whole is neutralized by adding 12 parts of glacial acetic acid and then diluted with 154 parts of water to establish a final weight of 500 parts of an extremely finely dispersed pigment paste containing 20% of pigment which, in conjunction with a suitable binder, can be used for dyeing and printing textile materials.

*Example 8*

580 parts of a pigment filter cake containing 41.3% (=240 parts) of the pigment from diazotized 2:5-dichloroaniline and 2:3-hydroxynaphthoic acid-ortho-methoxyphenylamide are mixed in a kneader together with 40 parts of a dispersant prepared by adding 15 mols of ethylene oxide on to 1 mol of di-tertiary butyl-para-cresol and 170 parts of a solution of about 75% strength in n-butanol of a melamine-formaldehyde condensation product etherified with n-butanol.

100 parts of sodium hydroxide solution of 30% strength are then added to the mixture. On continued kneading the pigment combines with the dispersant and the melamine resin to form a soft, plastic paste. After some time the bulk of the water initially present in the filter cake can be decanted together with a corresponding share of the sodium hydroxide solution. After washing once with 500 parts of sodium hydroxide solution of 15% strength, a compact flushed mass is obtained which lends itself readily to kneading. There are then added another 100 parts of the above-mentioned non-ionic dispersant, the whole is kneaded until it has become homogeneous and again washed with a further 500 parts of sodium hydroxide solution of 15% strength. The alkali solution is decanted and the flushed mass left in the kneader is neutralized with 50 parts of glacial acetic acid. Finally, the whole is diluted with water, while being further kneaded, to form 1000 parts of a fine, stable, aqueous dispersion containing 24% of pigment, about 13% of lacquer resin, 14% of dispersant and 49% of water. The butanol initially contained in the lacquer resin is substantially completely extracted during the flushing process and the subsequent washing so that the final dispersion practically contains no more volatile solvents.

The aforementioned solution in n-butanol of the melamine-formaldehyde condensation product etherified with n-butanol can be prepared in the known manner, for example by etherifying a condensation product from 1 mol of melamine and about 4 mols of formaldehyde with an excess of n-butanol and then evaporating the resulting solution to a dry content of about 75%.

*Example 9*

918 parts of the pigment filter cake described in Example 5 (=333.3 parts of dry pigment) are mixed in a kneader with 200 parts of a non-ionic dispersant prepared by an additive reaction of ethylene oxide with a mixture of fatty alcohols (obtained by reducing coconut fat) and with 500 parts of sodium hydroxide solution of 30% strength. Two phases are immediately formed, one consisting of aqueous sodium hydroxide solution and the other of a paste which still contains aqueous alkali solution as well as all of the pigment and the non-ionic dispersant. By further kneading the doughy phase can be turned into a coherent mass so that it is easy to decant the squeezed-out aqueous sodium hydroxide solution. Provided the non-ionic dispersant has been prepared by adding less than about 30 mols, for example 10 or 20 mols, of ethylene oxide, on to 1 mol of fatty alcohol agglomeration is achieved within a short time at room temperature (about 20° C.). On the other hand, when the dispersant used contains more, for example 35 or 100 mols, of ethylene oxide per mol of fatty alcohol the flushed mass can be caused to agglomerate only by heating it to an elevated temperature, for example 60–70° C.

The aqueous sodium hydroxide solution is then decanted and the dough is vigorously kneaded at room temperature twice more with 500 parts of sodium hydroxide solution of 15% strength on each occasion, and after each washing the aqueous sodium hydroxide solution is decanted. Finally, there remain in the kneader 650 parts of a soft dough which is neutralized with about 50 parts of glacial acetic acid and diluted with about 300 parts of water to make 1000 parts of a viscid dough containing 33.3% of the extremely finely dispersed brown pigment color; it can be diluted with water in any desired proportion and used, for example, in conjunction with a suitable binder, for dyeing paper pulp, or for printing or dyeing textile materials or leather, or for the manufacture of dispersion paints.

*Example 10*

976 parts of a pigment filter cake containing 21.3% (=208 parts) of the blue pigment of the formula

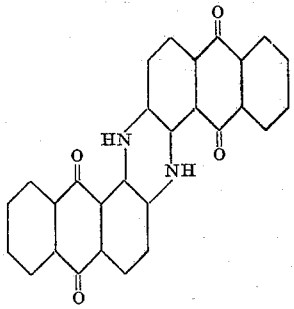

are mixed in a kneader with
210 parts of a solution of about 75% strength in n-butanol of a melamine-formaldehyde condensation product etherified with n-butanol,
55 parts of xylene,
140 parts of a non-ionic dispersant prepared by adding 15 mols of ethylene oxide on to 1 mol of paratertiary octylphenol, and
50 parts of sodium hydroxide solution of 30% strength.

After some time there is obtained a flushed mass containing the pigment, the dispersant and a resin solution, in the form of a plastic, soft dough from which it is easy to decant part of the aqueous alkali solution which no longer contains any pigment.

The flushed mass is washed by being vigorously kneaded twice with 500 parts of sodium hydroxide solution of 15% strength on each occasion and each time the alkali solution is decanted from the pigment paste which is becoming increasingly compact.

Finally there are obtained
650 parts of a flushed mass containing about 90 parts of sodium hydroxide solution of 15% strength in addition to the pigment, dispersant, melamine resin and xylene. The mass is neutralized with
20 parts of glacial acetic acid and diluted with
152 parts of water with further kneading. Finally, there
___
are obtained
822 parts of an aqueous dispersion containing pigment and melamine resin solution, in the form of a viscid paste which can be diluted with water in any desired proportion. In conjunction with a suitable binder said paste can be used for dyeing and printing textile materials.

*Example 11*

1388 parts of a pigment filter cake containing 14.4% (=200 parts) of α-copper phthalocyanine are mixed in a kneader with
180 parts of a solution of about 75% strength in n-butanol of a melamine-formaldehyde condensation product etherified with nu-butanol,
140 parts of the non-ionic dispersant used in Example 3,
60 parts of meta-xylene and
200 parts of sodium hydroxide solution of 30% strength.
After the pigment, dispersant, melamine resin and xylene have spontaneously combined to form a plastic substance, the aqueous solution containing the bulk of the water initially contained in the pigment filter cake as well as sodium hydroxide solution is decanted and the pigment mass is washed three times with 500 parts of sodium hydroxide solution of 15% strength on each occasion. Finally there are obtained
650 parts of a compact, kneadable substance which contains in addition to the pigment, the dispersant and the melamine resin dissolved in xylene, about 100 parts of sodium hydroxide solution of 15% strength. The mixture is diluted with
329 parts of water, and neutralized with
21 parts of glacial acetic acid and there are finally obtained
___
1000 parts of a viscid paste which can be diluted with water in any desired proportion and contains pigment and melamine resin in an extremely finely dispersed form.

What is claimed is:

1. Process for the manufacture of stable aqueous pigment dispersions, which comprises mixing an aqueous pigment filter cake of an organic alkali-resistant pigment with a non-ionic dispersant which is soluble in an acid to weakly alkaline medium but insoluble in concentrated aqueous alkalis, adding to the mixture containing the said dispersant in aqueous solution an amount of alkali metal hydroxide sufficient to cause the dispersant to separate from the aqueous alkaline solution and to form a separate phase, working the pigment into the dispersant phase, removing the bulk of the resulting pigment-free aqueous alkaline solution, and converting the non-ionic dispersant by neutralizing the residual alkali and by adding water into an aqueous solution which contains the pigment in a finely dispersed state, the said non-ionic dispersant being a reaction product of 5 to 150 mols of ethylene oxide with one mol of a water-insoluble organic compound, of the formula R—X—H, wherein R represents a hydrocarbon radical having from 8 to 24 carbon atoms and X is selected from the group consisting of —COO—, —CO—NH—, —O—, —S— and —NH—, and the ratio of pigment to said non-ionic dispersant being 1:0.5 to 1:2.

2. Process for the manufacture of stable aqueous pigment dispersions, which comprises mixing an aqueous pigment filter cake of an organic alkali-resistant pigment with a non-ionic dispersant which is soluble in an acid to weakly alkaline medium but insoluble in concentrated aqueous alkalis and with a hardenable water-insoluble etherified methylol compound of a substance of amide character capable of forming hardenable aminoplasts with formaldehyde, adding to the mixture containing the said dispersant in aqueous solution an amount of alkali metal hydroxide sufficient to cause the dispersant to separate from the aqueous alkaline solution and to form a separate phase, working the pigment into the dispersant phase, removing the bulk of the resulting pigment-free aqueous alkaline solution, neutralizing the remaining mass and adding water to form a dispersant solution which contains both the pigment and the said water-insoluble etherified methylol compound in a finely dispersed state, the said non-ionic dispersant being a reaction product of 5 to 150 mols of ethylene oxide with one mol of a water-insoluble organic compound, of the formula R—X—H, wherein R represents a hydrocarbon radical having from 8 to 24 carbon atoms and X is selected from the group consisting of —COO—, —CO—NH—, —O—, —S— and —NH—, and the ratio of pigment to said non-ionic dispersant being 1:0.5 to 1:2.

3. Process for the manufacture of a stable aqueous pigment dispersion, which comprises mixing 705 parts by weight of an aqueous pigment filter cake containing 34% of chlorinated copper phthalocyanine with 240 parts by weight of a non-ionic dispersant prepared by reacting 15 mols of ethylene oxide with 1 mol of hydroabietyl alcohol, adding 200 parts by weight of sodium hydroxide solution of 30% strength to the mixture to cause the dispersant to separate from the aqueous alkaline solution and to form a separate phase, working the pigment into the dispersant phase, removing the bulk of the resulting pigment-free aqueous alkaline solution, kneading the remaining mass with 500 parts by weight of sodium hydroxide solution of 20% strength, removing the bulk of the pigment-free aqueous alkaline solution, and converting the pigment-containing non-ionic dispersant by neutralizing the residual alkali with glacial acetic acid and by adding water into an aqueous solution which contains the pigment in a finely dispersed state.

4. A process for the manufacture of a stable aqueous pigment dispersion, which comprises mixing 363 parts by weight of a pigment filter cake containing 36.3% of the brown pigment of the formula

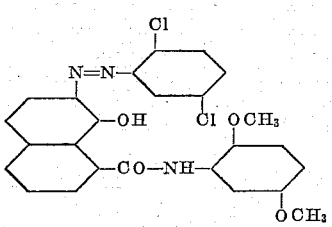

with 80 parts by weight of a non-ionic dispersant prepared by reacting 25 mols of ethylene oxide with 1 mol of castor oil, adding 200 parts by weight of sodium hydroxide solution of 30% strength to the mixture to cause the dispersant to separate from the aqueous alkaline solution and to form a separate phase, working the pigment into the dispersant phase, removing the bulk of the resulting pigment-free aqueous alkaline solution, and converting the pigment-containing non-ionic dispersant by neutralizing the residual alkali with glacial acetic acid and by adding water into an aqueous solution which contains the pigment in a finely dispersed state.

5. A process for the manufacture of a stable aqueous pigment dispersion, which comprises mixing 231 parts by weight of a pigment filter cake containing 43.2% of the red pigment of the formula

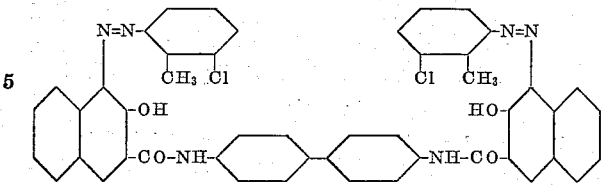

with 70 parts by weight of a non-ionic dispersant prepared by reacting 50 mols of ethylene oxide with one mol of dodecylmercaptan, adding at about 50° C. 66 parts by weight of sodium hydroxide solution of 30% strength to the mixture to cause the dispersant to separate from the aqueous alkaline solution and to form a separate phase, working the pigment into the dispersant phase, removing the bulk of the resulting pigment-free aqueous alkaline solution, and converting the pigment-containing non-ionic dispersant by neutralizing the residual alkali with glacial acetic acid and by adding water into an aqueous solution which contains the pigment in a finely dispersed state.

6. Process for the manufacture of a stable aqueous pigment dispersion, which comprises mixing 580 parts by weight of an aqueous pigment filter cake containing 41.3% of the pigment from diazotized 2:5-dichloroaniline and 2:3-hydroxynaphthoic acid-ortho-methoxyphenylamide with 140 parts by weight of a dispersant prepared by reacting 15 mols of ethylene oxide with 1 mol of di-tertiary butyl-para-cresol and with 170 parts by weight of a solution of about 75% strength in n-butanol of a melamine-formaldehyde condensation product etherified with n-butanol, adding 100 parts of sodium hydroxide solution of 30% strength to the mixture to cause the dispersant to separate from the aqueous alkaline solution and to form a separate phase, working the pigment into the dispersant phase, removing the bulk of the resulting pigment-free aqueous alkaline solution, neutralizing the remaining mass with glacial acetic acid and adding water to form a dispersant solution which contains both the pigment and the said etherified melamine-formaldehyde condensation product in a finely dispersed state.

References Cited in the file of this patent

UNITED STATES PATENTS

| | | |
|---|---|---|
| 2,844,486 | Lamar | July 22, 1958 |
| 2,907,670 | Katz | Oct. 6, 1959 |